(12) United States Patent
Lee

(10) Patent No.: US 8,630,803 B2
(45) Date of Patent: Jan. 14, 2014

(54) METHOD AND APPARATUS FOR TRIP PLANNING AND RECORDING MEDIUM

(75) Inventor: Yu-Cheng Lee, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 485 days.

(21) Appl. No.: 12/824,242

(22) Filed: Jun. 28, 2010

(65) Prior Publication Data

US 2011/0035143 A1 Feb. 10, 2011

(30) Foreign Application Priority Data

Aug. 4, 2009 (TW) .............................. 98126213 A

(51) Int. Cl.
*G01C 21/00* (2006.01)
*G08G 1/123* (2006.01)

(52) U.S. Cl.
USPC ...................................... 701/438; 340/995.24

(58) Field of Classification Search
USPC ............ 701/400–541; 340/988–996; 715/769
See application file for complete search history.

(56) References Cited

U.S. PATENT DOCUMENTS

| 6,278,938 B1 | 8/2001 | Alumbaugh |
| 2003/0182052 A1 | 9/2003 | DeLorme et al. |
| 2008/0036778 A1* | 2/2008 | Sheha et al. ................. 345/502 |
| 2008/0231869 A1* | 9/2008 | Morimoto ..................... 358/1.1 |
| 2009/0282353 A1* | 11/2009 | Halbherr et al. .............. 715/769 |

FOREIGN PATENT DOCUMENTS

| WO | 2007047485 | 4/2007 |
| WO | 2009002942 | 12/2008 |

OTHER PUBLICATIONS

"Search Report of Europe Counterpart Application," Issued on Sep. 27, 2010, p. 1-p. 4.
"First Office Action of Europe Counterpart Application," Issued on Nov. 11, 2010, p. 1-p. 6.
"Office Action of Taiwan Counterpart Application", issued on Jan. 8, 2013, p. 1-p. 13.

* cited by examiner

*Primary Examiner* — Muhammad Shafi
(74) *Attorney, Agent, or Firm* — Jianq Chyun IP Office

(57) ABSTRACT

A method and an apparatus for trip planning and a recording medium are provided. The method is suitable for a mobile device having a touch screen. In the method, a trip plan panel comprising a plurality of waypoint blocks arranged according to an arrangement sequence is displayed on the touch screen. Then, a touch operation of dragging executed between a point of interest (POI) and the trip plan panel is received, so as to input the POI in one of the waypoint blocks. Finally, according to the arrangement sequence of the waypoint blocks, a path between the POIs in the way point blocks is planned.

14 Claims, 10 Drawing Sheets

METHOD AND APPARATUS FOR TRIP PLANNING AND RECORDING MEDIUM

CROSS-REFERENCE TO RELATED APPLICATION

This application claims the priority benefit of Taiwan application serial No. 98126213, filed on Aug. 4, 2009. The entirety of the above-mentioned patent application is hereby incorporated by reference herein and made a part of this specification.

BACKGROUND

Global position system (GPS) integrates satellite and wireless technique to provide users with accurate position, speed, and time information. Presently, GPS has been widely applied to mobile devices in the market, such as mobile phones, personal digital assistants (PDAs), car PCs, etc. Besides conventional positioning functions, the mobile device equipped with GPS can also provide advanced functions such as trip planning, voice navigation, scenic spot searching by incorporating with an electronic map and navigation software, so as to facilitate users resolving trip problems.

The conventional GPS device has a built-in electronic map, and provides functions of trip planning and navigation. When the user inputs a name or coordinates of a destination into the GPS device, or directly selects a specific location on the electronic map, the GPS device then plans a path between a detected current location and the location of the input destination, and sends voice messages to guide the user to go to the destination according to the planned path.

However, in many cases, the user probably wants to consecutively go to different destinations, though the conventional GPS device can only allow the user to adjust an existed path by means of inputting waypoints. In detail, the user has to input locations, addresses, or coordinates of the waypoints, and re-executes the path planning function, and then the GPS device can incorporate the waypoints into the trip plan, which is quite complicated. Moreover, when planning a trip, the operating interfaces of the conventional GPS device for inputting waypoints or changing the order of the waypoints are quite complicated, which may lead to great inconvenience for the user.

SUMMARY

Accordingly, the present application is directed to a method for trip planning, by which points of interest (POIs) are dragged to a trip plan panel from a map, and paths between the POIs are sequentially planned, so as to obtain a trip plan required by a user.

The present application is directed to an apparatus for trip planning, in which POIs may be dragged between an electronic map and a plurality of blocks in a trip plan panel, so as to freely add/delete, edit, and customize a trip plan.

The present application provides a method for trip planning, which is suitable for a mobile device having a touch screen. The method comprises following steps: a. a trip plan panel is displayed on the touch screen, wherein the trip plan panel comprises a plurality of waypoint blocks displayed according to an arrangement sequence; b. a touch operation of dragging between a point of interest (POI) and the trip plan panel is received, so as to input the POI in one of the waypoint blocks; c. paths between the POIs in the waypoint blocks are planned according to the arrangement sequence of the waypoint blocks and assembled to establish a trip plan.

In an example, the method further comprises repeatedly executing step b., so as to respectively input a plurality of POIs in the waypoint blocks, and plan the paths between the POIs.

In an example, after the step of assembling the paths to establish the trip plan, the method further comprises storing the trip plan, receiving a string input, and recording the string input as a name of the trip plan.

In an example, after the step of assembling the paths to establish the trip plan, the method further comprises modifying and editing the trip plan.

In an example, after the step of assembling the paths to establish the trip plan, the method further comprises sharing the trip plan.

In an example, before step b., the method further comprises displaying a location list including a plurality of locations, wherein the locations are used for being dragged to the trip plan panel.

In an example, before step b., the method further comprises displaying an electronic map, so that a point on the electronic map is capable of being dragged to the trip plan panel.

In an example, before step b., the method further comprises displaying an electronic map, wherein at least one POI is marked on the electronic map for being dragged to the trip plan panel.

In an example, the step b. comprises receiving a touch operation of dragging from the POI to one of the waypoint blocks, so as to input the POI in the waypoint block where the POI is dragged to.

In an example, the step b. comprises receiving a touch operation of dragging from one of the waypoint blocks to a location on the electronic map, so as to input the location on the electronic map to the dragged waypoint block to serve as the POI, and marking the POI at the location of the electronic map.

In an example, after the step of assembling the paths to establish the trip plan, the method further comprises displaying an electronic map comprising all of the POIs and paths in the trip plan.

In an example, the step a. further comprises displaying a switching function icon on the trip plan panel, receiving an operation of the switching function icon to switch among the waypoint blocks, and displaying the POI in the switched waypoint block on the electronic map.

In an example, after the step of displaying the electronic map, the method further comprises receiving a touch operation performed on a location of the electronic map, and marking a POI tag at the location for being dragged to the trip plan panel.

In an example, after the step of marking the POI tag at the location of the electronic map, the method further comprises receiving a touch operation of shifting on the electronic map to shift a display range of the electronic map without moving the POI tag, so as to taking a location of the POI tag on the shifted electronic map as a positioning location of the POI.

In an example, the method further comprises receiving an operation of a deleting function icon on the electronic map, so as to delete all of the POIs in the waypoint blocks that are located within a display range of the electronic map.

In an example, the method further comprises receiving a touch operation of dragging a waypoint block out of the trip plan panel, so as to delete the POI in the waypoint block.

In an example, the trip plan method further comprises receiving a touch operation of dragging from a waypoint block to a deleting function icon located outside the trip plan panel, so as to delete the POI in the waypoint block.

In an example, a space is provided between two adjacent waypoint blocks, and the step a. further comprises displaying an indicator at the space between the two adjacent waypoint blocks to indicate the arrangement sequence of the two adjacent waypoint blocks, or displaying a number on the waypoint block or on the edge of the waypoint block to indicate the arrangement sequence of the waypoint blocks.

In an example, step b. comprises receiving a touch operation of dragging from the POI to the space between the two adjacent waypoint blocks, inserting a new waypoint block between the two adjacent waypoint blocks located at two sides of the space, and inputting the POI in the new waypoint block.

In an example, the step b. comprises receiving a touch operation of dragging from a third waypoint block to the space between the two adjacent waypoint blocks, and inserting the third waypoint block between the two adjacent waypoint blocks located at two sides of the space.

In an example, the step c. comprises skipping the waypoint blocks not inputted with the POIs in the trip plan panel, and planning the paths between the POIs in the waypoint blocks according to the arrangement sequence of the remaining waypoint blocks.

The present application provides an apparatus for trip planning, which comprises a touch screen, a trip plan panel display module and a path plan module. The touch screen is used for receiving a touch operation of a user. The trip plan panel display module is used for displaying a trip plan panel comprising a plurality of waypoint blocks on the touch screen, and inputting a POI in one of the waypoint blocks according to a touch operation of dragging between the POI and the trip plan panel that is received by the touch screen, wherein the waypoint blocks are displayed in the trip plan panel according to an arrangement sequence. The path plan module is used for planning paths between the POIs in the waypoint blocks according to the arrangement sequence of the waypoint blocks, and the trip plan panel display module assembles the paths to establish a trip plan.

In an example, the path plan module further respectively inputs a plurality of POIs in the waypoint blocks according to a plurality of touch operations received by the touch screen, and plans the paths between the POIs.

In an example, the apparatus further comprises a storage unit for storing the trip plan established by the trip plan panel display module.

In an example, the storage unit further records a string input to serve as a name of the trip plan.

In an example, the apparatus further comprises a location list display module for displaying a location list comprising a plurality of locations, wherein the locations are used for being dragged to the trip plan panel.

In an example, the apparatus further comprises an electronic map display module for displaying an electronic map, so that a point on the electronic map is capable of being dragged to the trip plan panel.

In an example, the apparatus further comprises an electronic map display module for displaying an electronic map, wherein at least one POI is marked on the electronic map for being dragged to the trip plan panel.

In an example, according to a touch operation of dragging from the POI to one of the waypoint blocks that is received by the touch screen, the trip plan panel display module inputs the POI in the waypoint block where the POI is dragged to.

In an example, according to a touch operation of dragging from one of the waypoint blocks to a location on the electronic map that is received by the touch screen, the trip plan panel display module further inputs the location on the electronic map to the dragged waypoint block to serve as the POI.

In an example, the electronic map display module further displays an electronic map comprising all of the POIs and paths in the trip plan.

In an example, the trip plan panel display module further displays a switching function icon on the trip plan panel, and switches the waypoint blocks according to an operation of the switching function icon received by the touch screen. The electronic map display module further displays the POI in the switched waypoint block on the displayed electronic map.

In an example, according to a touch operation received by the touch screen that is performed on a location of the electronic map, the trip plan panel display module further marks a POI tag at the location for being dragged to the trip plan panel.

In an example, according to a touch operation of shifting on the electronic map that is received by the touch screen, the trip plan panel display module shifts a display range of the electronic map without moving the POI tag, and takes a location of the POI tag on the shifted electronic map as a positioning location of the POI.

In an example, the trip plan panel display module further deletes the POIs in the waypoint blocks that are located within a display range of the electronic map according to an operation of a deleting function icon on the electronic map that is received by the touch screen.

In an example, according to a touch operation of dragging from a waypoint block out of the trip plan panel that is received by the touch screen, the trip plan panel display module further deletes the POI in the waypoint block.

In an example, according to a touch operation of dragging from a waypoint block to a deleting function icon located outside the trip plan panel, the trip plan panel display module further deletes the POI in the waypoint block.

In an example, the trip plan panel display module provides a space between two adjacent waypoint blocks, and displays an indicator at the space between the two adjacent waypoint blocks to indicate an arrangement sequence of the two adjacent waypoint blocks, or displays a number on the waypoint block or on the edge of the waypoint block to indicate the arrangement sequence of the waypoint blocks.

In an example, the trip plan panel display module inserts a new waypoint block between the two adjacent waypoint blocks located at two sides of the space according to a touch operation of dragging from the POI to the space between the two adjacent waypoint blocks that is received by the touch screen, and inputs the POI in the new waypoint block.

In an example, the trip plan panel display module inserts a third waypoint block between the two adjacent waypoint blocks located at two sides of the space according to a touch operation of dragging from the third waypoint block to the space between the two adjacent waypoint blocks that is received by the touch screen.

In an example, the path plan module skips the waypoint blocks not inputted with the POIs in the trip plan panel, and plans the paths between the POIs in the waypoint blocks according to the arrangement sequence of the remaining waypoint blocks.

The present application further provides a recording medium which records a computer program to be loaded into a mobile device to execute following steps: a. a trip plan panel is displayed on the touch screen, wherein the trip plan panel comprises a plurality of waypoint blocks displayed according to an arrangement sequence; b. a touch operation of dragging between a point of interest (POI) and the trip plan panel is received, so as to input the POI in one of the waypoint blocks; c. paths between the POIs in the waypoint blocks are planned according to the arrangement sequence of the waypoint blocks and assembled to establish a trip plan.

In the present application, according to the method and the apparatus for trip planning, a trip plan panel is displayed on the touch screen of the mobile device for the user to freely drag the locations in the electronic map or in the location list to the waypoint blocks in the trip plan panel, and the arrangement sequence of the waypoint blocks in the trip plan panel may be easily exchanged, so as to quickly establish a desired trip plan.

In order to make the aforementioned and other features and advantages of the present application comprehensible, several exemplary examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION

When a user makes a trip plan including a plurality of waypoints through an electronic map or navigation software, the user generally hopes that the trip plan can be arranged according to a desired sequence and easily modified (e.g. adding/deleting the trip plan or changing a sequence of the trip plan). Therefore, the present application provides an intuitive trip plan tool, by which a trip plan panel comprising a plurality of sequentially arranged waypoint blocks is displayed aside the electronic map, so that the user may directly set points of interest (POIs) to the waypoint blocks to serve as waypoints by means of dragging from the electronic map or a POI list. Each time when the user completes a dragging operation of the POI to the waypoint block, the mobile device may determine a sequence between the input POI and other POIs according to an arrangement sequence of the waypoint blocks, and immediately plan paths between the POIs, so that the user may complete the trip plan in the shortest time.

Figure 1:
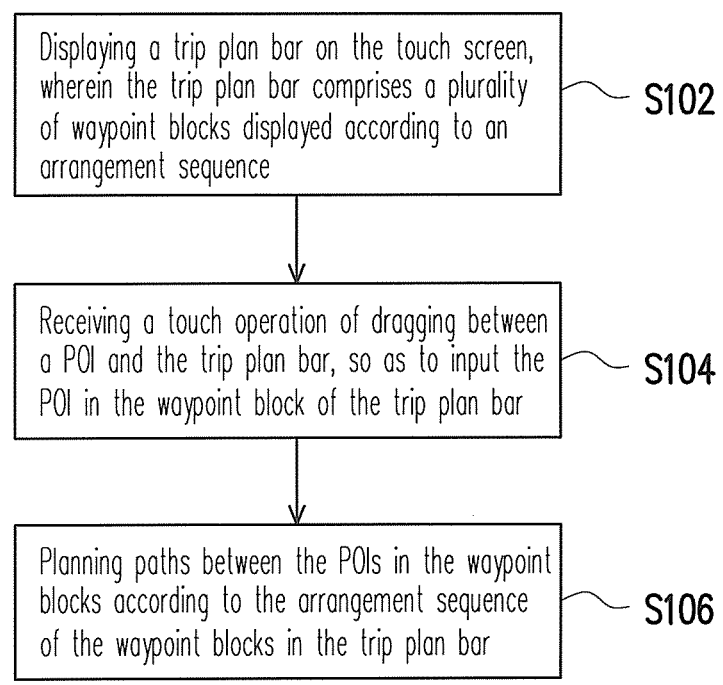
FIG. 1 is a flowchart illustrating a method for trip planning according to an example of the present application.

FIG. 1 is a flowchart illustrating a method for trip planning according to an example of the present application. Referring to FIG. 1, the method of the present example is adapted to a mobile device having a touch screen, and is used for planning a trip including a plurality of waypoints. Wherein, the mobile device comprises a mobile phone, a smart phone, a personal digital assistant (PDA), a PDA phone, a notebook computer, a game device, a multimedia player or a car PC, etc., which is not limited by the present example. The steps of the method are as follows.

First, the mobile device displays a trip plan panel on the touch screen (step S102). The trip plan panel comprises a plurality of waypoint blocks arranged according to an arrangement sequence. In one example, a space is provided between each two adjacent waypoint blocks, wherein an arrow may be displayed in the space to indicate a sequence relation between the two adjacent waypoint blocks, or numbers may be displayed on the waypoint blocks or on the edges of the waypoint blocks to indicate the sequence relation of the waypoint blocks. Therefore, the waypoint blocks in the trip plan panel may be connected in serial to form a virtual waypoint string.

Next, the mobile device receives a touch operation of dragging between the POI and the trip plan panel through the touch screen. For example, the mobile device receives a touch operation of dragging from the POI to the trip plan panel or from the waypoint block of the trip plan panel to the POI, so as to input the POI in the waypoint block of the trip plan panel (step S104). In detail, in an example, the mobile device displays an electronic map on the touch screen, and marks POIs on the electronic map. The user may complete setting one waypoint by selecting a POI displayed on the electronic map or searching a POI, and then dragging the selected or searched POI to the trip plan panel. In another example, the mobile device displays a location list on the touch screen, wherein the location list is, for example, a POI list comprising a plurality of POIs or a contact list comprising address information, etc. The user may complete setting one waypoint by selecting a POI displayed on the POI list or selecting a contact or an address displayed on the contact list and then dragging the selected POI to the trip plan panel.

It should be noticed that when the POI to be selected by the user is not displayed in the electronic map, the user may complete setting one corresponding waypoint by directly pressing a location on the electronic map or searching a location to serve as the POI or serve as a new POI on the electronic map, and dragging the selected or searched POI to the trip plan panel. For example, when the mobile device receives a touch operation (for example, continuous pressing) performed on a certain location of the electronic map by the user, the mobile device displays a POI tag at this location, so that the user may drag the POI tag to the trip plan panel.

Moreover, the user may change a position of the POI tag marked on the electronic map, and move the POI tag to a desired position. In detail, the user may first click the POI tag displayed on the electronic map. When the POI tag is clicked or long-pressed, the POI tag may be, for example, floated off the electronic map or floated off the electronic map and amplified. At this time, the user may move the POI tag to a new position, and the position where the POI tag finally stays on the electronic map is served as a renewed positioning location of the corresponding POI.

Alternatively, when the POI tag is clicked and is floated off the electronic map, the user may shift a display range of the electronic map by touching and dragging the electronic map, and the position where the POI tag finally stays on the electronic map is served as the renewed positioning location of the corresponding POI. It should be noticed that during the process of shifting the display range of the electronic map, the floated POI tag, for example, stays at its original position, and only the underneath electronic map is shifted. According to such an approach for shifting the electronic map, the user may accurately renew the POI tag to a specific position on the electronic map in case that the POI tag is not blocked by a hand of the user.

After setting a waypoint, the mobile device automatically plans paths between the POIs in the waypoint blocks according to the arrangement sequence of the waypoint blocks in the trip plan panel (step S106). Wherein, if there are blank waypoint blocks (i.e. waypoint blocks not inputted with the POIs) between the waypoint blocks in the trip plan panel, when planning the paths, the mobile device may skip the waypoint blocks not inputted with the POIs, and plan the paths between the POIs in the waypoint blocks only according to the arrangement sequence of the remaining waypoint blocks. In an example, the waypoint blocks not inputted with the POIs may be removed from the trip plan panel when the user selects a command. In another example, when the paths of the trip plan are stored and recalled for inspection, the waypoint blocks not inputted with the POIs are no longer displayed in the trip plan panel.

Moreover, according to the above descriptions, the waypoint blocks in the trip plan panel may be connected in serial to form a waypoint string. When the user inputs the POI in one of the waypoint blocks, based on the position of the waypoint block in the trip plan panel, the mobile device may plan the paths between the POIs in the waypoint block and the adjacent waypoint blocks.

In detail, when the user set a new waypoint in the blank trip plan panel, the mobile device plans a path started from a current position or a specific position to the waypoint. If the trip plan panel already has other waypoints, when the user set the new waypoint in the trip plan panel, the mobile device plans the paths between the POIs according to the arrangement sequence of the waypoint blocks in the trip plan panel.

Figure 2:
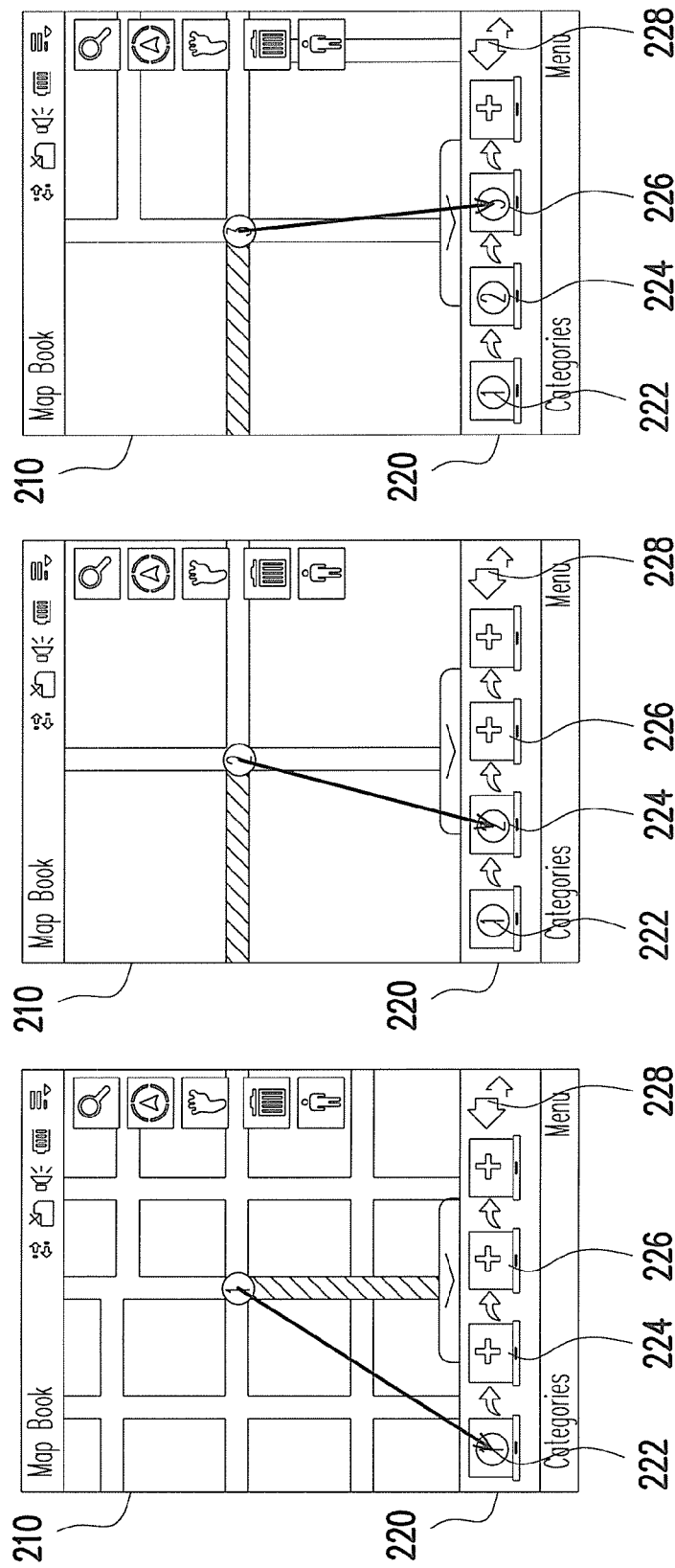
FIGS. 2(a), 2(b) and 2(c) are figures illustrating an example of adding waypoints according to an example of the present application.

For example, FIGS. 2(a), 2(b) and 2(c) are figures illustrating an example of adding waypoints according to an example of the present application. Wherein, the user input a POI 1 in a waypoint block 222 by dragging the POI 1 located on an electronic map 210 to the waypoint block 222 in a trip plan panel 220. At this time, the mobile device may plan a path started from a starting point, for example, a current position or a specific starting point to the POI 1 (shown in FIG. 2(a)). Wherein, the current position of the mobile device or the specific starting point is, for example, obtained by self-positioning of the mobile device or by selecting a location in the electronic map or in a POI list when the user activates the trip plan panel 220 or after the user inputs the POI, which is not limited by the present example. Moreover, in an example, the POI 1 in the first waypoint block 222 may also serve as the starting point of the trip plan, and other POIs serve as waypoints. In an example, the POI in the last waypoint block may serve as an end point of the trip plan.

Next, the user may search or pick a POI 2 in the electronic map 210, and drag the POI 2 to a waypoint block 224 (shown in FIG. 2(b)). At this time, since the waypoint block 224 is arranged behind the waypoint block 222 and the mobile device has completed path planning from the starting point to the POI 1, the mobile device only needs to plan a path from the POI 1 to the POI 2, or the mobile device may also re-plan a path from the starting point to the POI 2 via the POI 1.

Similarly, the user may continually search a POI 3 in the electronic map 210, and drag the POI 3 to a waypoint block 226, so that the mobile device may plan a path from the POI 2 to the POI 3 (shown in FIG. 2(c)). Therefore, the mobile device may establish a trip plan started from the current position to the POI 3 via the POI 1 and the POI 2.

In an example, the mobile device may, for example, displays a switching function icon 228 in the trip plan panel 220, so that the user may perform switching among the waypoint blocks in the trip plan panel 220. In detail, when the mobile device receives an operation of the switching function icon 228 from the user, switching is performed among the waypoint blocks according to a direction indicated by the switching function icon 228, and meanwhile the POI in the switched waypoint block is displayed in the electronic map 210. In an example, when the mobile device receives a sliding touch operation for the trip plan panel performed by the user, the trip plan panel is shifted along a direction of the sliding touch operation, so that the user may select the waypoint block originally out of the display range of the touch screen to be operated or viewed.

Figure 3:
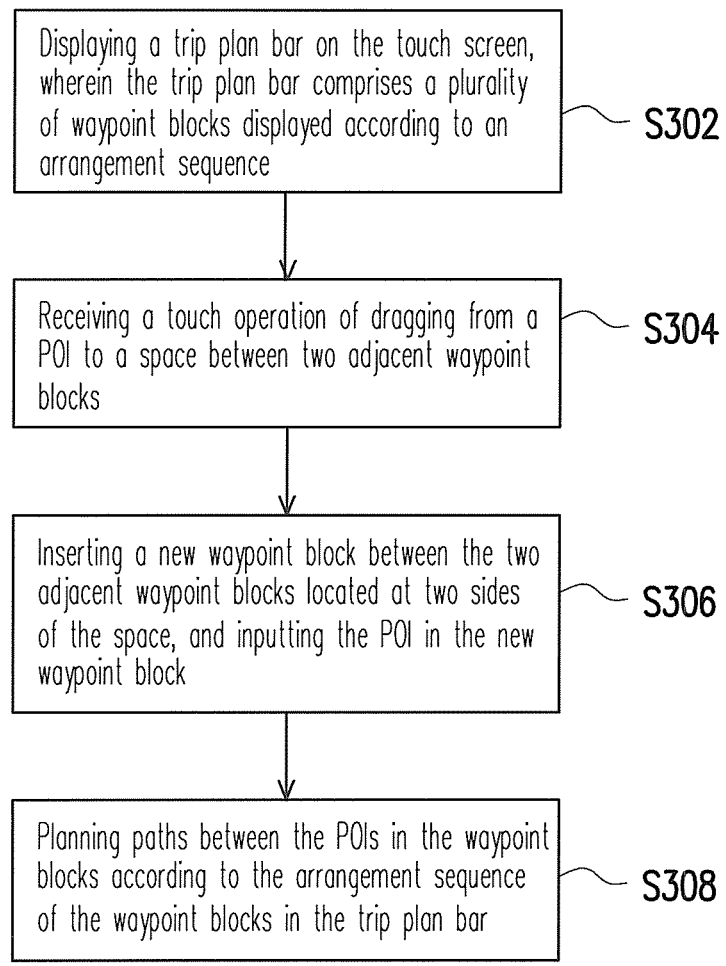
FIG. 3 is a flowchart illustrating a method for trip planning according to an example of the present application.

Besides the aforementioned method of inputting the POI in the waypoint block, the present application also provides a method of inputting the POI to the space between two adjacent waypoint blocks, so as to add a new waypoint in the trip plan panel. FIG. 3 is a flowchart illustrating a method for trip planning according to an example of the present application. Referring to FIG. 3, in the present example, the mobile device also displays a trip plan panel on the touch screen (step S302), wherein the trip plan panel comprises a plurality of the waypoint blocks arranged according to an arrangement sequence.

Next, the mobile device receives a touch operation of dragging from a POI to the space between two adjacent waypoint blocks through the touch screen (step S304), so as to insert a new waypoint block between the two adjacent waypoint blocks located at two sides of the space, and input the POI in the new waypoint block (step S306).

Finally, the mobile device automatically plans paths between the POIs in the waypoint blocks according to the arrangement sequence of the waypoint blocks in the trip plan panel (step S308).

Figure 4B:
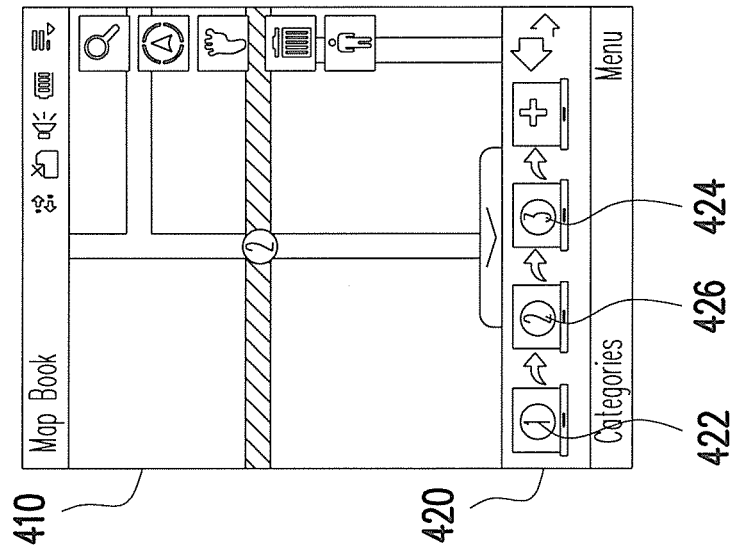
FIGS. 4(a) and 4(b) are figures illustrating an example of adding waypoints according to an example of the present application.
Figure 4A:
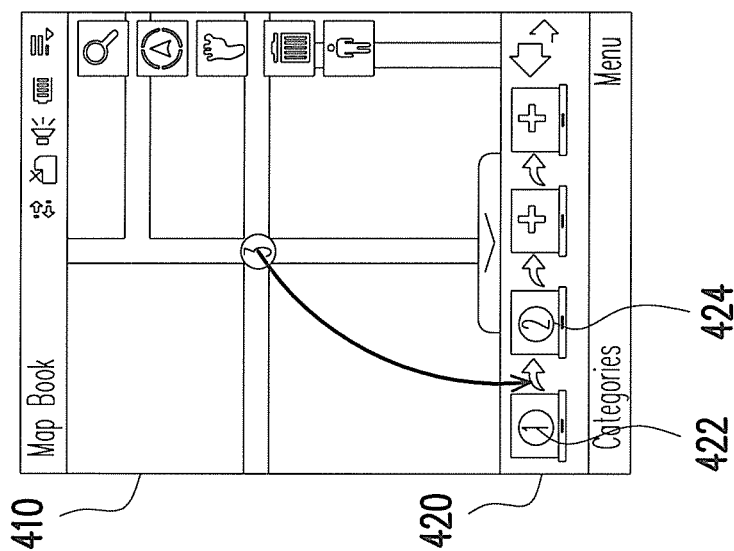

For example, FIGS. 4(a) and 4(b) are figures illustrating an example of adding waypoints according to an example of the present application. Wherein, the mobile device has already input POIs 1 and 2 in waypoint blocks 422 and 424 of a trip plan panel 420 (shown in FIG. 3(a)). At this time, if the user further searches a POI 3 on an electronic map 410 and drags the POI 3 to a space between the waypoint blocks 422 and 424, the mobile device automatically inserts a new waypoint block 426 between the waypoint blocks 422 and 424, and inputs the POI 3 in the waypoint block 426 (shown in FIG. 3(b)), and meanwhile renumbers the POIs in the waypoint blocks 422, 426 and 424.

Moreover, when the POI 3 is input, since the waypoint block 426 is located between the waypoint blocks 422 and 424, the mobile device re-plans a path started from the POI 1 to the POI 3, and a path started from the POI 3 to the POI 2. Therefore, the mobile device may establish a trip plan started from the current position to the POI 2 via the POI 1 and the POI 3.

Alternatively, in an example, an adding function icon (not shown) is configured at the end position of the trip plan panel 420, so that the user may insert a new blank waypoint block between the waypoint blocks 422 and 424 by selecting and dragging the adding function icon to the space between the two adjacent waypoint blocks 422 and 424, and then inputs a POI to the new blank waypoint block.

Figure 5:
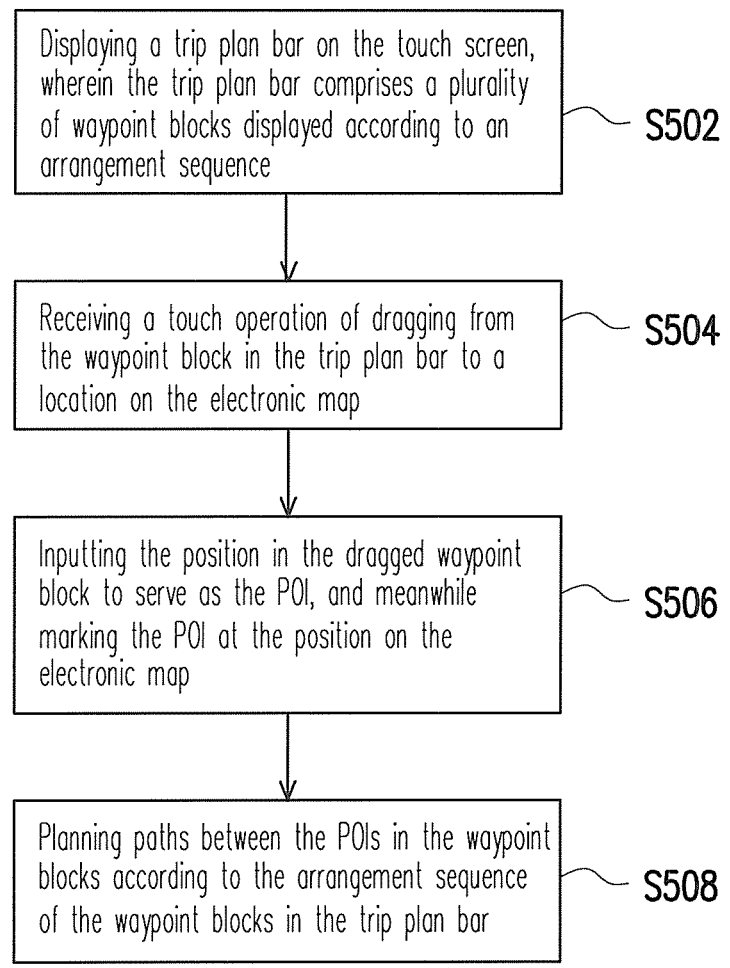
FIG. 5 is a flowchart illustrating a method for trip planning according to an example of the present application.

Moreover, in an example, the user may also reversely drag a waypoint block in the trip plan panel to a certain position on the electronic map, so as to input the position in the waypoint block being dragged. For example, FIG. 5 is a flowchart illustrating a method for trip planning according to an example of the present application. Referring to FIG. 5, in the present example, the mobile device also displays a trip plan panel on the touch screen (step S502), wherein the trip plan panel comprises a plurality of the waypoint blocks arranged according to an arrangement sequence. Next, the mobile device receives a touch operation of dragging from a waypoint block in the trip plan panel to a certain position on the electronic map through the touch screen (step S504), and inputs such position in the waypoint block being dragged to serve as a POI, and meanwhile marks the POI at such position on the electronic map (step S506). Finally, the mobile device automatically plans paths between the POIs in the waypoint blocks according to the arrangement sequence of the waypoint blocks in the trip plan panel (step S508).

Figure 6C:
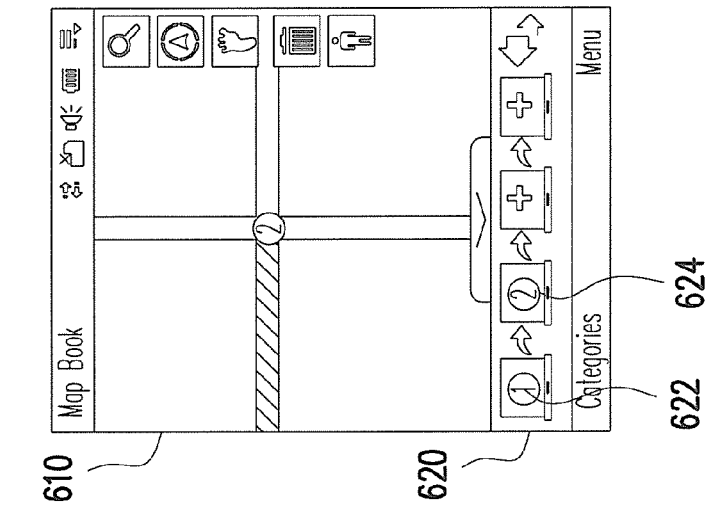
FIGS. 6(a), 6(b) and 6(c) are figures illustrating an example of adding waypoints according to an example of the present application.
Figure 6B:
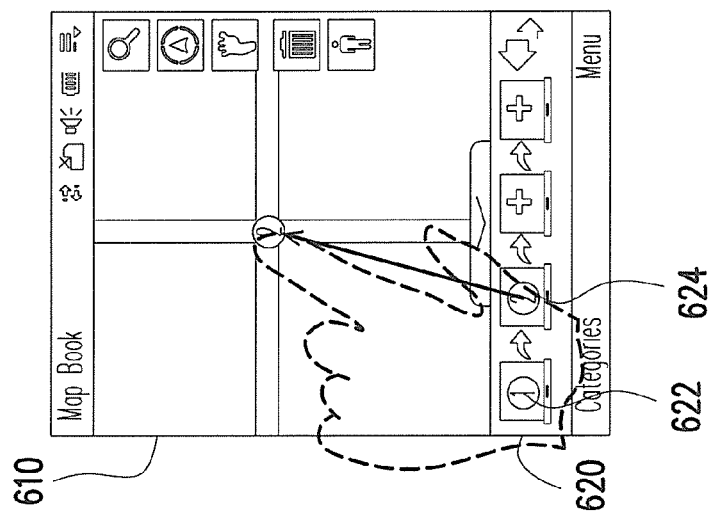
Figure 6A:
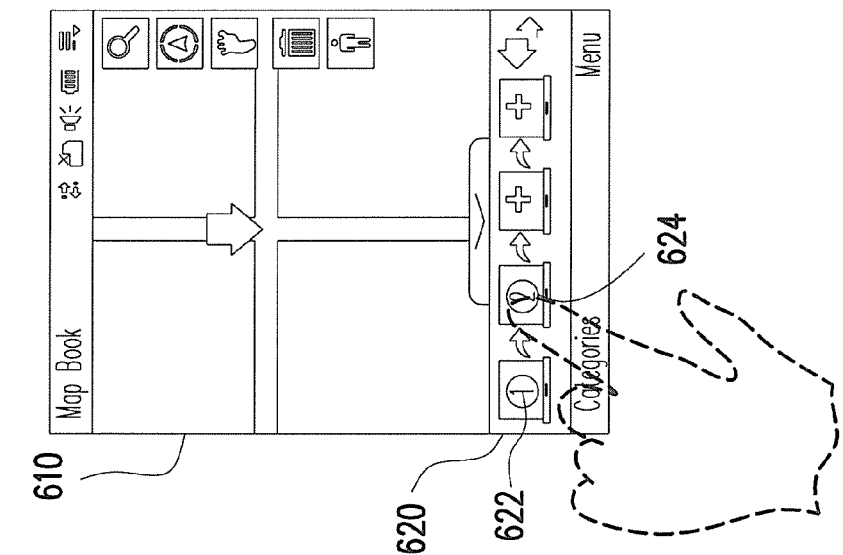

For example, FIGS. 6(*a*), 6(*b*) and 6(*c*) are figures illustrating an example of adding waypoints according to an example of the present application. Wherein, the mobile device has already input the POI 1 in a waypoint block 622 of a trip plan panel 620. Now, if the user touches and holds the waypoint block 624, the waypoint block 624 displays a POI 2 (shown in FIG. 6(*a*)), and if the POI 2 is further dragged to a location A on the electronic map 610, the mobile device then marks the POI 2 at the location A, and automatically takes the location A as a positioning location of the POI 2 (shown in FIG. 6(*b*)). After the touch operation of the user is completed, the mobile device may plan a path started from the POI 1 to the POI 2 (shown in FIG. 6(*c*)).

According to the above method, the user may freely input a plurality of POIs in the waypoint blocks to set the waypoints through simple touching and dragging operations, and may determine a sequence of the waypoints. Each time after the user completes setting a waypoint, the mobile device may plan paths between such waypoint and two adjacent waypoints for the user to inspect the re-planned path, or may plan paths started from a starting point to an end point via all of the waypoints after all of the waypoints are set. Finally, the mobile device may assemble the paths between all of the waypoints to establish an integral trip plan.

Moreover, in an example, when the preset blank waypoint blocks of the trip plan panel are filled by the waypoints, a new blank waypoint block is automatically added at the end position of the trip plan panel, so that the user may drag a new POI thereto. Meanwhile, the trip plan panel is shifted, so that the end position where the new blank waypoint block is generated can be displayed in the screen.

Alternatively, in an example, the user may click an adding function icon (not shown) to generate a POI tag, and then drag the POI tag to a location on the electronic map to serve as a new POI, and a waypoint block inputted with the location of the POI is added at the end position of the trip plan panel according to such method.

In an example, after the user establishes the trip plan, the trip plan may be further stored in the mobile device, so that the user may recall the trip plan at anytime for inspection and modification, and may share it with other users. For example, the user may send the trip plan to mobile devices of other users, or may send the trip plan to a network or database for other users to browse or download. When the trip plan is stored, the mobile device may, for example, require the user to input a name of the trip plan. Moreover, when the trip plan is stored, the mobile device may, for example, display an electronic map and mark all the POIs and paths of the trip plan on the electronic map. For example, a shrunk electronic map may be displayed to facilitate the user viewing details of the trip plan.

Besides the aforementioned trip planning methods for adding waypoints, the present application also provides editing functions such as deleting the waypoints and changing the sequence of the waypoints, so as to improve flexibility of the trip planning. Other examples are provided below for further description.

Figure 7:
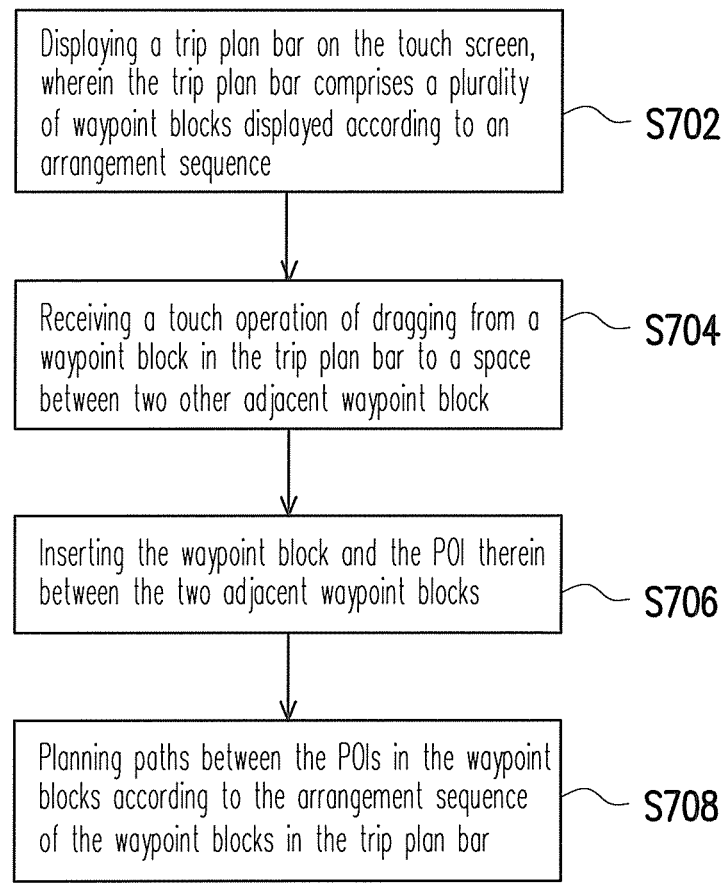
FIG. 7 is a flowchart illustrating a method for trip planning according to an example of the present application.

Regarding the editing function of changing the sequence of the waypoints, FIG. 7 is a flowchart illustrating a method for trip planning according to an example of the present application. Referring to FIG. 7, in the present example, the mobile device also displays a trip plan panel on the touch screen (step S702), wherein the trip plan panel comprises a plurality of waypoint blocks arranged according to an arrangement sequence. Next, the mobile device, for example, receives a touch operation of dragging from a certain waypoint block in the trip plan panel to a space between other two adjacent waypoint blocks (step S704), so as to insert the waypoint block and the POI in the waypoint block between the two adjacent waypoint blocks (step S706). Finally, the mobile device automatically plans paths between the POIs in the waypoint blocks according to the arrangement sequence of the waypoint blocks in the trip plan panel (step S708).

Figure 8B:
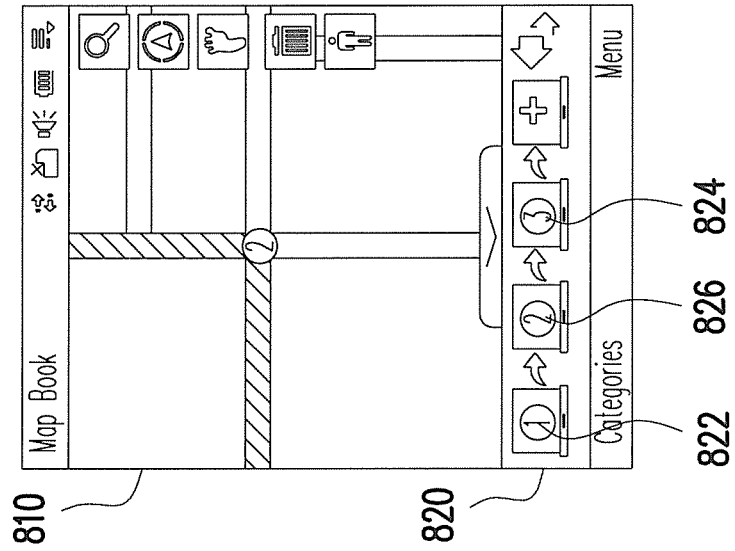
FIGS. 8(a) and 8(b) are figures illustrating an example of a method for trip planning according to an example of the present application.
Figure 8A:
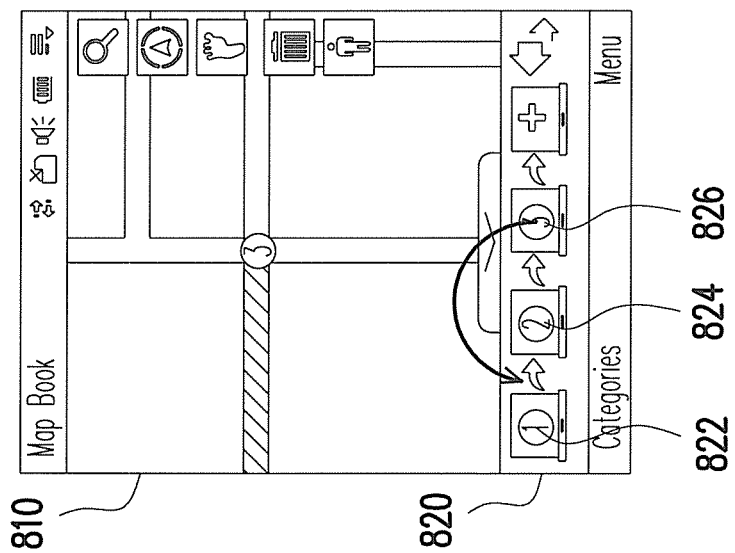

For example, FIGS. 8(*a*) and 8(*b*) are figures illustrating an example of a method for trip planning according to an example of the present application. Wherein, the mobile device has already input POIs 1, 2 and 3 in waypoint blocks 822, 824 and 826 of a trip plan panel 820 (shown in FIG. 8(*a*)). Now, if the user drags the waypoint block 826 to a space between the waypoint blocks 822 and 824, the mobile device directly inserts the waypoint block 826 between the waypoint blocks 822 and 824 (shown in FIG. 8(*b*)), and meanwhile renumbers the POIs in the waypoint blocks 822, 826 and 824. Therefore, the user may also change the sequence of the defined waypoint blocks via a touching and dragging approach and sequentially re-plan the paths.

Figure 9:
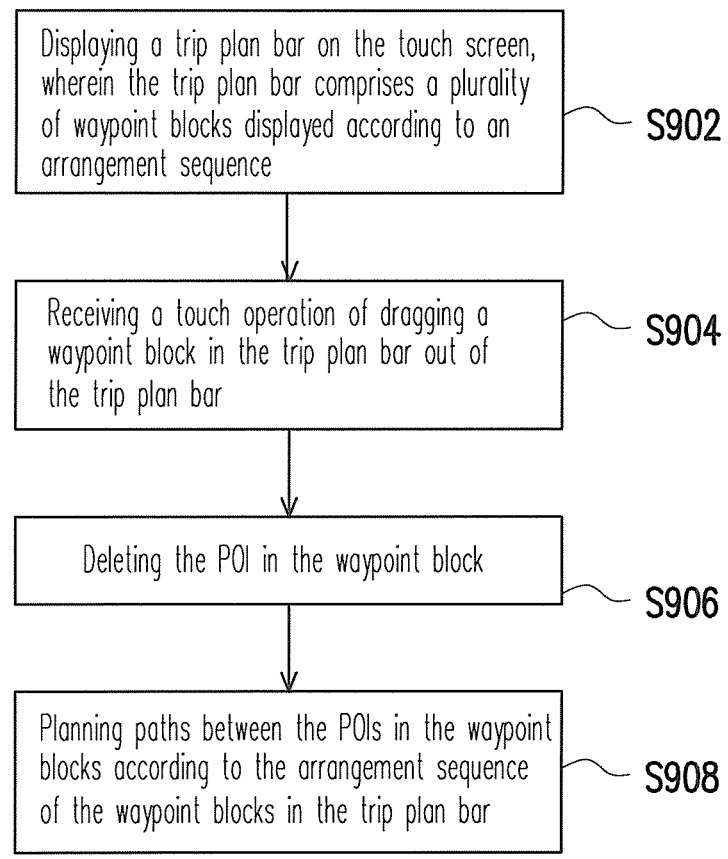
FIG. 9 is a flowchart illustrating a method for trip planning according to an example of the present application.

Regarding the deleting function of the waypoints, FIG. 9 is a flowchart illustrating a method for trip planning according to an example of the present application. Referring to FIG. 9, in the present example, the mobile device also displays a trip plan panel on the touch screen (step S902), wherein the trip plan panel comprises a plurality of waypoint blocks arranged according to an arrangement sequence. Next, the mobile device, for example, receives a touch operation of dragging a certain waypoint block in the trip plan panel out of the trip plan panel (step S904), so as to delete the POI in the waypoint block (step S906). Finally, the mobile device automatically plans paths between the POIs in the waypoint blocks according to the arrangement sequence of the waypoint blocks in the trip plan panel (step S908). Wherein, if the deleted POI is in the waypoint block located at the end position of the trip plan panel, the mobile device only removes the corresponding planned path, and does not execute a path planning operation.

However, in another example, the mobile device receives a touch operation of dragging from a certain waypoint block in the trip plan panel to a deleting function icon located outside the trip plan panel, so as to delete the POI in the waypoint block. In another example, the mobile device receives a selecting operation of the deleting function icon displayed aside the electronic map, so as to delete all of the POIs in the waypoint blocks of the trip plan panel that are located within a display range of the electronic map, or delete a selected POI when there are a plurality of POIs within a display range.

Figure 10:
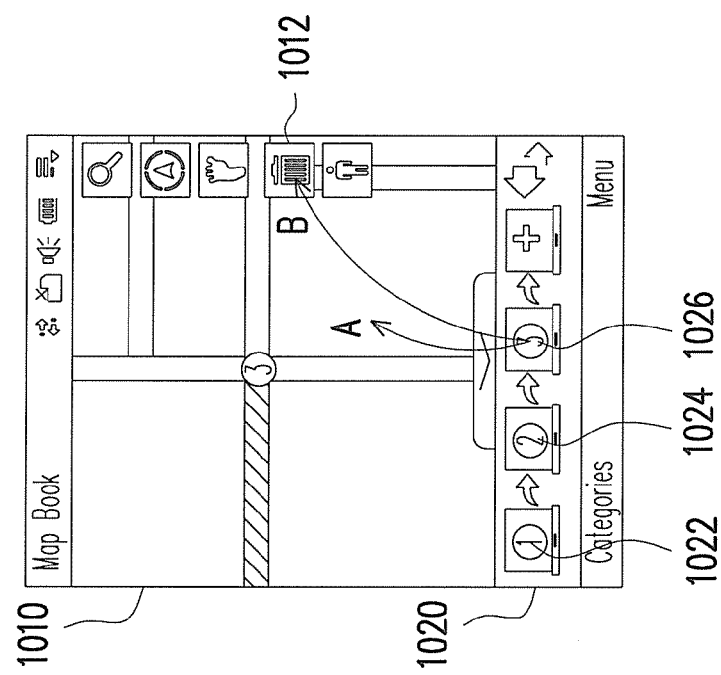
FIG. 10 is a figure illustrating an example of a method for trip planning according to an example of the present application.

For example, FIG. 10 is a figure illustrating an example of a method for trip planning according to an example of the present application. Wherein, the mobile device has already input POIs 1, 2 and 3 in waypoint blocks 1022, 1024 and 1026 of a trip plan panel 1020. Wherein, when the user drags the waypoint block 1026 out of the trip plan panel 1020 (shown as a touch operation A), the mobile device deletes the POI in the waypoint block 1026. In another example, when the user drags the waypoint block 1026 to a deleting function icon 1012 located outside the trip plan panel 1020 (shown as a touch operation B), the mobile device deletes the POI in the waypoint block 1026. In still another example, when the user directly press the deleting function icon 1012 displayed aside the electronic map 1010, the mobile device deletes all of the POIs (i.e. the POI 3) currently within a display range of the electronic map 1010, or delete a selected POI when there are a plurality of POIs within the display range.

According to the above method for trip planning, the present application also provides a corresponding hardware apparatus, so that the method for trip planning may be applied to mobile devices such as mobile phones, smart phones, personal digital assistants (PDAs), PDA phones, notebook PCs, game devices, multimedia players or car PCs, etc. Another example is provided below for further description.

Figure 11:
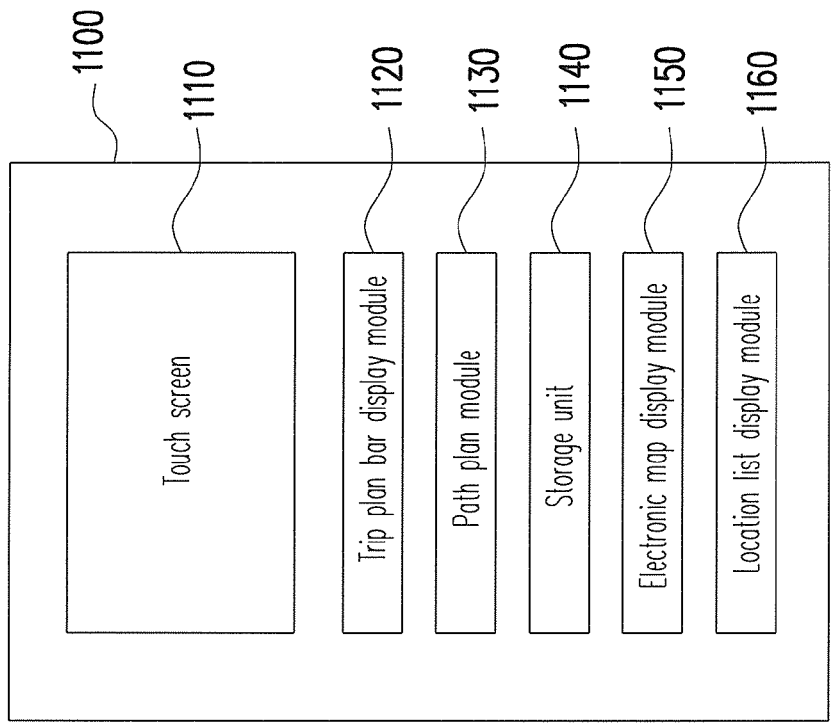
FIG. 11 is a block diagram illustrating an apparatus for trip planning according to an example of the present application.

FIG. 11 is a block diagram illustrating an apparatus for trip planning according to an example of the present application. Referring to FIG. 11, the trip planning apparatus 1100 of the present example is, for example, a mobile device such as a mobile phone, a smart phone, a PDA, a PDA phone, a notebook computer, a game device, a multimedia player or a car PC, etc. The trip planning apparatus 1100 mainly comprises a touch screen 1110, a trip plan panel display module 1120, a path plan module 1130, a storage unit 1140, an electronic map display module 1150 and a location list display module 1160, and the functions thereof are described as follows.

The touch screen 1110 is, for example, a liquid crystal display (LCD) comprising a touch panel, which is used for displaying images of the trip planning apparatus 1100, and is used for receiving touch operations performed by the user.

The trip plan panel display module 1120 is used for displaying a trip plan panel comprising a plurality of waypoint blocks on the touch screen, 1110, wherein the waypoint blocks are displayed in the trip plan panel according to an arrangement sequence. The trip plan panel display module 1120 also inputs a POI in the waypoint block according to a touch operation of dragging between the POI and the trip plan panel received by the touch screen 1110.

The path plan module 1130 plans paths between the POIs in the waypoint blocks according to the arrangement sequence of the waypoint blocks having the POIs each time after the trip plan panel display module 1120 completes setting a waypoint. Wherein, if there are blank waypoint blocks (i.e. waypoint blocks not inputted with the POIs) between the waypoint blocks in the trip plan panel, when the path plan module 1130 plans the paths, the waypoint blocks not inputted with the POIs are skipped, and the paths between the POIs in the waypoint blocks are planned according to the arrangement sequence of the remaining waypoint blocks.

According a same approach, the trip plan panel display module 1120 may input a plurality of the POIs in the waypoint blocks of the trip plan panel according to a plurality of touch operations received by the touch screen 1110, and the path plan module 1130 plans the paths between the POIs, and assembles the paths to establish an integral trip plan.

The storage unit 1140 is used for storing the trip plan established by the trip plan panel display module 1120 and recording a character string input received by the touch screen 1110 to serve as a name of the trip plan. Further, the stored trip plan may be recalled at anytime for viewing and modification. Moreover, the stored trip plan may be shared with other users. For example, the trip plan may be sent to mobile devices of other users, or may be sent to a network or database for other users to browse or download.

In an example, the trip planning apparatus 1100 of the present example may further display an electronic map comprising the POIs through the electronic map display module 1150, or display a location list through the location list display module 1160, wherein the location list is, for example, a POI list comprising POIs or a contact list having address information, etc., so that the user may add a POI or a location to the trip plan panel by dragging the POI or the address to the trip plan panel.

In detail, according to a touch operation of dragging from a certain POI in the electronic map to the waypoint block that is received by the touch screen 1110, the trip plan panel display module 1120 inputs the POI in the waypoint block where the POI is dragged to. In another example, according to a touch operation of dragging from the waypoint block to a certain location on the electronic map that is received by the touch screen 1110, the trip plan panel display module 1120 inputs such location in the waypoint block being dragged to serve as the POI.

Besides the POIs existed on the electronic map, according to a touch operation performed on a certain location of the electronic map that is received by the touch screen 1110, the trip plan panel display module 1120 displays a POI tag at such location, so that the user may drag the POI tag to the trip plan panel. After the POI tag is displayed, according to a touch operation of shifting on the electronic map that is received by the touch screen 1110, the trip plan panel display module 1120 shifts the display range of the electronic map without moving the POI tag, and a location of the POI tag on the shifted electronic map is served as a positioning location of the POI.

Besides the aforementioned methods for adding the waypoints, the trip plan panel display module 1120 also provides users with functions such as adding, deleting or moving the waypoints in the trip plan panel by means of dragging, which are described respectively below.

Regarding deleting of the POIs, the electronic map display module 1150, for example, displays a deleting function icon on the electronic map for the user to delete the POIs. The user may drag an undesired POI from the waypoint block to the deleting function icon to delete the POI, or may directly press the deleting function icon to delete all the POIs in the waypoint blocks that are currently located within a display range of the electronic map. Further, the user may directly drag the POI in the waypoint block out of the trip plan panel to delete the POI.

Regarding moving of the POI, the trip plan panel display module 1120 provides a space between two adjacent waypoint blocks, and displays an indicator at the space to indicate an arrangement sequence of the two adjacent waypoint blocks, so that the user may drag a POI or a waypoint block to the space between the two adjacent waypoint blocks, so as to insert the POI between the two adjacent waypoint blocks. Detailed operation method has been described in the above example, and therefore the description thereof is not repeated herein.

In an example, the trip plan panel display module 1120 may further display a switching function icon, so that the user may perform switching between the displayed waypoint blocks, and may switch the electronic map displayed by the electronic map display module 1150.

The present application further provides a recording medium which records a computer program to be loaded into a mobile device to execute the trip planning method described above. The computer program is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps in the trip planning method and various functions of the trip planning apparatus described above.

In summary, in the present application, the method and the apparatus for trip planning apply a visual interface for the user to set a destination and waypoints, and the waypoints may be freely added, deleted or edited through simple touching and dragging operations, so as to facilitate the user quickly establishing a desired trip plan.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An apparatus for trip planning, comprising:
    a touch screen, receiving a touch operation of a user;
    an electronic map display module, displaying an electronic map and at least one POI on the electronic map;
    a trip plan panel display module, displaying a trip plan panel comprising a plurality of waypoint blocks on the touch screen, and inputting the POI in one of the waypoint blocks according to a touch operation of dragging between the POI and the trip plan panel received by the touch screen, wherein the waypoint blocks are displayed in the trip plan panel according to an arrangement sequence, and according to a touch operation of dragging from one of the waypoint blocks to a location on the electronic map received by the touch screen, the trip plan panel display module inputs the location on the electronic map to the dragged waypoint block to serve as the POI; and
    a path plan module, planning paths between the POIs in the waypoint blocks according to the arrangement sequence of the waypoint blocks, and the trip plan panel display module assembling the paths to establish a trip plan.

2. The apparatus of claim 1, wherein a starting point of the trip plan is the POI of a first waypoint block or a current position of the mobile device.

3. The apparatus of claim 2, further comprising:
    a storage unit, storing the trip plan established by the trip plan panel display module.

4. The apparatus of claim 1, further comprising:
    a location list display module, displaying a location list comprising a plurality of locations, wherein the locations are used for being dragged to the trip plan panel.

5. The apparatus of claim 1, wherein a point on the electronic map is capable of being dragged to the trip plan panel.

6. The apparatus of claim 5, wherein the trip plan panel display module further displays a switching function icon, and switches the waypoint blocks according to an operation of the switching function icon received by the touch screen, and the electronic map display module further displays the POI in the switched waypoint block on the displayed electronic map.

7. The apparatus of claim 5, wherein according to a touch operation received by the touch screen that is performed on a location of the electronic map, the trip plan panel display module displays a POI tag at the location for being dragged to the trip plan panel.

8. The apparatus of claim 7, wherein according to a touch operation of shifting on the electronic map received by the touch screen, the trip plan panel display module shifts a display range of the electronic map without moving the POI tag, and takes a location of the POI tag on the shifted electronic map as a positioning location of the POI.

9. The apparatus of claim 5, wherein the trip plan panel display module further deletes the POIs in the waypoint blocks that are located within a display range of the electronic map according to an operation of a deleting function icon on the electronic map that is received by the touch screen.

10. The apparatus of claim 1, wherein according to a touch operation of dragging a waypoint block out of the trip plan panel received by the touch screen, the trip plan panel display module further deletes the POI in the waypoint block being dragged out.

11. The apparatus of claim 1, wherein according to a touch operation of dragging from a waypoint block to a deleting function icon located outside the trip plan panel, the trip plan panel display module deletes the POI in the waypoint block.

12. The apparatus of claim 11, wherein the trip plan panel display module inserts a new waypoint block between the two adjacent waypoint blocks located at two sides of the space according to a touch operation of dragging from the POI to the space between the two adjacent waypoint blocks that is received by the touch screen, and inputs the POI in the new waypoint block.

13. The apparatus of claim 11, wherein the trip plan panel display module inserts a third waypoint block between the two adjacent waypoint blocks located at two sides of the space according to a touch operation of dragging from the third waypoint block to the space between the two adjacent waypoint blocks that is received by the touch screen.

14. The apparatus of claim 1, wherein the path plan module skips the waypoint blocks not inputted with the POIs in the trip plan panel, and plans the paths between the POIs in the waypoint blocks according to the arrangement sequence of the remaining waypoint blocks.

* * * * *